(12) United States Patent
Shintani (10) Patent No.: US 9,366,009 B2
(45) Date of Patent: Jun. 14, 2016

(54) CONSTRUCTION MACHINE

(71) Applicant: KOBELCO CONSTRUCTION MACHINERY CO., LTD., Hiroshima-shi (JP)

(72) Inventor: Noriaki Shintani, Hiroshima (JP)

(73) Assignee: KOBELCO CONSTRUCTION MACHINERY CO., LTD., Hiroshima-shi (JP)

(*) Notice: Subject to any disclaimer, the term of this patent is extended or adjusted under 35 U.S.C. 154(b) by 0 days.

(21) Appl. No.: 14/665,271

(22) Filed: Mar. 23, 2015

(65) Prior Publication Data

US 2015/0275477 A1 Oct. 1, 2015

(30) Foreign Application Priority Data

Mar. 28, 2014 (JP) ................................. 2014-069938

(51) Int. Cl.
 *B60K 13/04* (2006.01)
 *E02F 9/08* (2006.01)
 (Continued)

(52) U.S. Cl.
 CPC ............... *E02F 9/0883* (2013.01); *B60K 13/04* (2013.01); *E02F 9/0833* (2013.01); *F01N 3/2066* (2013.01); *F01N 13/002* (2013.01); *B60Y 2200/412* (2013.01); *F01N 2610/02* (2013.01);
 (Continued)

(58) Field of Classification Search
 CPC ....... E02F 9/0883; E02F 9/0833; B60K 13/04
 USPC .......................................................... 280/834
 See application file for complete search history.

(56) References Cited

U.S. PATENT DOCUMENTS

| | | | | |
|---|---|---|---|---|
| 6,485,088 | B1 * | 11/2002 | Miyachi ................. | B62D 25/10 264/45.7 |
| 7,722,308 | B2 * | 5/2010 | Sakitani .................. | E02F 9/006 414/680 |
| 7,988,167 | B2 * | 8/2011 | Sakitani .................... | B60R 3/00 280/163 |

(Continued)

FOREIGN PATENT DOCUMENTS

| | | |
|---|---|---|
| JP | 2010-236208 A | 10/2010 |
| JP | 2011-58247 A | 3/2011 |

(Continued)

OTHER PUBLICATIONS

Extended European Search Report issued Jul. 30, 2015 in Patent Application No. 15161086.2.

*Primary Examiner* — Joseph Rocca
*Assistant Examiner* — Michael Stabley
(74) *Attorney, Agent, or Firm* — Oblon, McClelland, Maier & Neustadt, L.L.P.

(57) ABSTRACT

Provided is a construction machine that enables to reduce the burden of the operator when the operator replenishes a liquid reducing agent. The construction machine includes an upper frame slewably provided on a lower traveling body, a reducing agent tank provided on the upper frame, and configured to accommodate therein a liquid reducing agent for reducing nitrogen oxide contained in exhaust gas, and a passage surface provided on the upper frame for allowing the operator to move to an engine. The reducing agent tank has an upper placement portion disposed on the right side of the passage surface at a position higher than the passage surface. The upper placement portion of the reducing agent tank has a replenishing port for allowing the operator to replenish the liquid reducing agent. The replenishing port is provided so as to face the passage surface.

4 Claims, 5 Drawing Sheets

(51) Int. Cl.
*F01N 3/20* (2006.01)
*F01N 13/00* (2010.01)

(52) U.S. Cl.
CPC . *F01N 2610/1406* (2013.01); *F01N 2610/1413* (2013.01)

(56) References Cited

U.S. PATENT DOCUMENTS

| | | | | |
|---|---|---|---|---|
| 8,177,387 B2 * | 5/2012 | Noda | ...................... | E02F 9/00 224/401 |
| 8,708,087 B2 * | 4/2014 | Kashu | ................... | B60K 13/04 180/291 |
| 8,876,163 B2 * | 11/2014 | Nishiyama | ........... | B60K 15/063 280/830 |
| 8,973,692 B1 * | 3/2015 | Okuda | ................ | B60L 11/1877 180/68.5 |
| 2011/0018308 A1 * | 1/2011 | Uto | ....................... | E02F 9/0833 296/181.1 |
| 2012/0067660 A1 * | 3/2012 | Kashu | .................... | B60K 13/04 180/296 |
| 2012/0174566 A1 | 7/2012 | Yamashita et al. | | |
| 2013/0071295 A1 * | 3/2013 | Terakawa | .............. | E02F 9/0858 422/168 |
| 2015/0016932 A1 | 1/2015 | Azuma et al. | | |
| 2015/0204051 A1 * | 7/2015 | Noda | ....................... | E02F 9/16 180/89.12 |

FOREIGN PATENT DOCUMENTS

| | | |
|---|---|---|
| JP | 2011-64132 | 3/2011 |
| JP | 2011-64132 A | 3/2011 |
| JP | 2013-160005 A | 8/2013 |
| WO | WO 2013/13716 A1 | 9/2013 |

* cited by examiner

FIG.1

FRONT ←——→ REAR

CONSTRUCTION MACHINE

BACKGROUND OF THE INVENTION

1. Field of the Invention

The present invention relates to a construction machine provided with a reducing agent tank configured to accommodate therein a liquid reducing agent for reducing nitrogen oxide contained in exhaust gas.

2. Description of the Background Art

Figure 5:
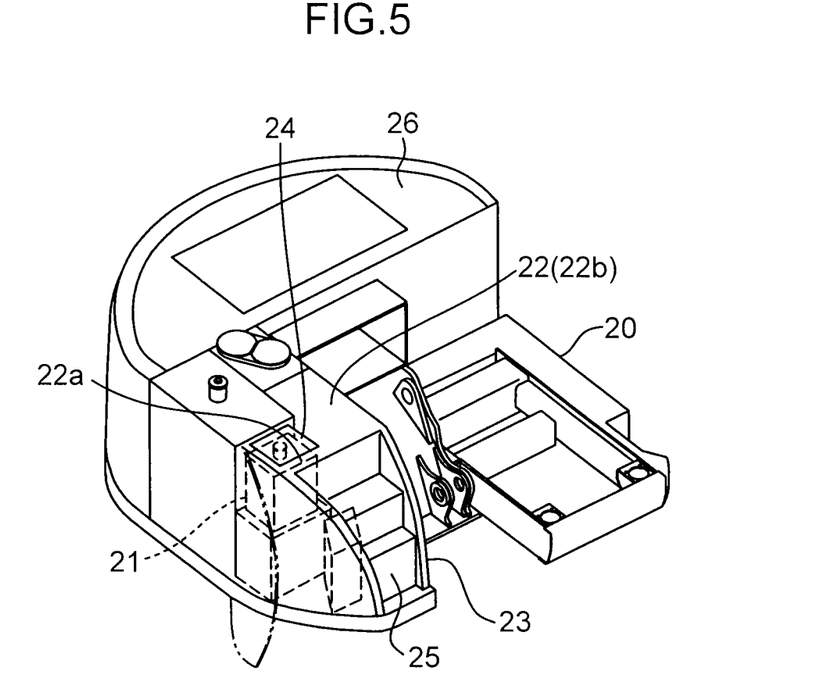
FIG. 5 is a perspective view for describing a conventional construction machine.

FIG. 5 is a partially enlarged perspective view of a construction machine described in Japanese Unexamined Patent Publication No. 2011-64132 (hereinafter, called as Patent Literature 1).

The construction machine described in Patent Literature 1 is provided with an upper frame 20 provided on a lower traveling body, a reducing agent tank 21 provided on the upper frame 20, a tank cover 22 for covering the reducing agent tank 21, and a front cover 23 disposed at a front position of the tank cover 22.

The reducing agent tank 21 accommodates therein a liquid reducing agent such as urea water for reducing nitrogen oxide contained in exhaust gas.

The tank cover 22 is provided with a covering portion 22a which covers the reducing agent tank 21 from above, and which includes an opening/closing lid 24 for allowing the operator to replenish the reducing agent tank 21 with a liquid reducing agent; and a passage portion 22b disposed laterally offset from the upper surface of the reducing agent tank 21.

The front cover 23 includes stairs 25 for allowing the operator to climb on the passage portion 22b of the tank cover 22.

When the operator climbs on the passage portion 22b of the tank cover 22 using the stairs 25, the operator walks on the passage portion 22b toward a device provided on the upper frame 20 (e.g. an engine provided in an engine room 26) for maintenance of the device.

In other words, in the construction machine described in Patent Literature 1, the upper surface of the tank cover (the upper surface of the passage portion 22b) is used as a passage surface on which the operator walks toward the device for maintenance service.

In the construction machine described in Patent Literature 1, the operator is also allowed to replenish the reducing agent tank 21 with a liquid reducing agent via the opening/closing lid 24 in a state that the operator stands on the passage surface (the upper surface of the passage portion 22b).

In the construction machine described in Patent Literature 1, however, the reducing agent tank 21 is provided below the passage surface. Therefore, the operator is forced to bend forward in a narrow space in order to replenish a liquid reducing agent and feels stressful. This is burden to the operator.

SUMMARY OF THE INVENTION

An object of the invention is to provide a construction machine that enables to reduce the burden of the operator when the operator replenishes a liquid reducing agent.

In view of the above, the invention provides a construction machine including a lower traveling body, an upper frame slewably provided on the lower traveling body, a reducing agent tank provided on the upper frame, and configured to accommodate therein a liquid reducing agent for reducing nitrogen oxide contained in exhaust gas, and a passage surface provided on the upper frame for allowing an operator to move to a predetermined device on the upper frame. The reducing agent tank includes an upper placement portion disposed laterally on the passage surface at a position higher than the passage surface. The upper placement portion of the reducing agent tank has a replenishing port for allowing the operator to replenish the liquid reducing agent, the replenishing port being provided so as to face the passage surface.

According to the invention, it is possible to reduce the burden of the operator when the operator replenishes a liquid reducing agent.

These and other objects, features and advantages of the present invention will become more apparent upon reading the following detailed description along with the accompanying drawings.

DESCRIPTION OF THE PREFERRED EMBODIMENT

In the following, an embodiment of the present invention is described referring to the drawings. It should be noted that the following embodiment is merely an example embodying the invention, and is not intended to limit the technical scope of the invention.

Figure 1:
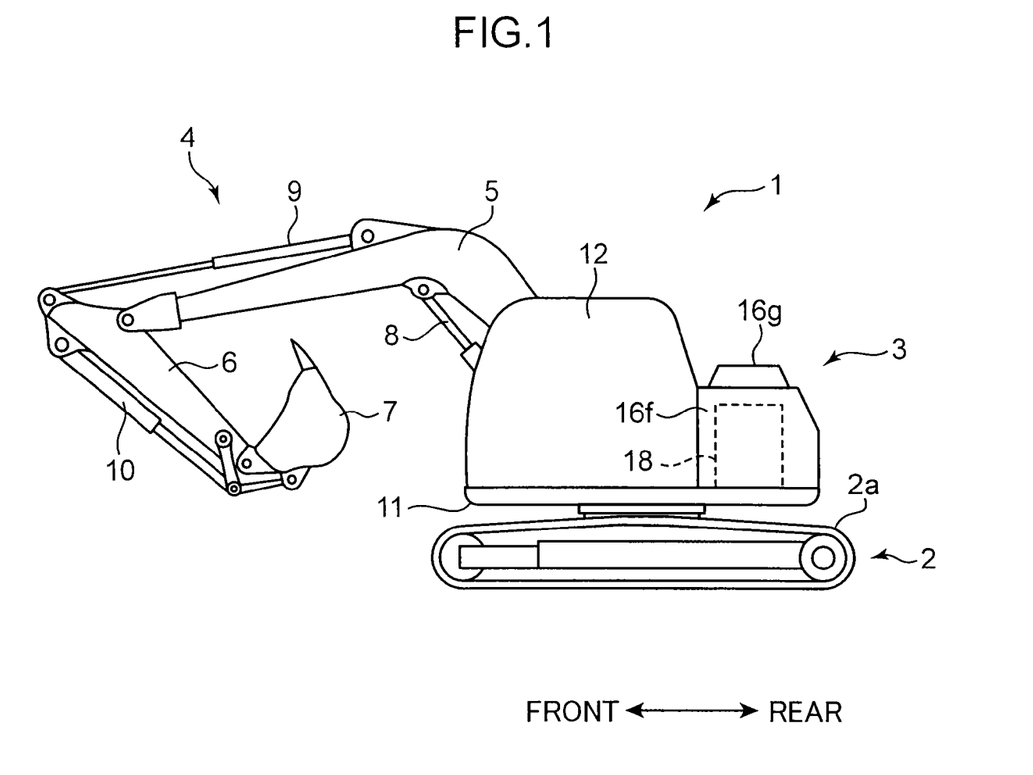
FIG. 1 is a left side view illustrating the entire configuration of a hydraulic excavator according to an embodiment of the invention.

Referring to FIG. 1, a hydraulic excavator 1 as an example of a construction machine embodying the invention is provided with a lower traveling body 2 including a pair of crawlers 2a, an upper slewing body 3 slewably provided on the lower traveling body 2, and a working attachment 4 displaceably attached with respect to the upper slewing body 3.

The working attachment 4 is provided with a boom 5 including a base end thereof attached on the upper slewing body 3, an arm 6 including a base end thereof attached on a distal end of the boom 5, and a bucket 7 attached on a distal end of the arm 6.

Further, the working attachment 4 is provided with a boom cylinder 8 which drives to raise and lower the distal end of the boom 5 with respect to the upper slewing body 3, an arm cylinder 9 which drives to rotate the arm 6 with respect to the boom 5, and a bucket cylinder 10 which drives to rotate the bucket 7 with respect to the arm 6.

Figure 2:
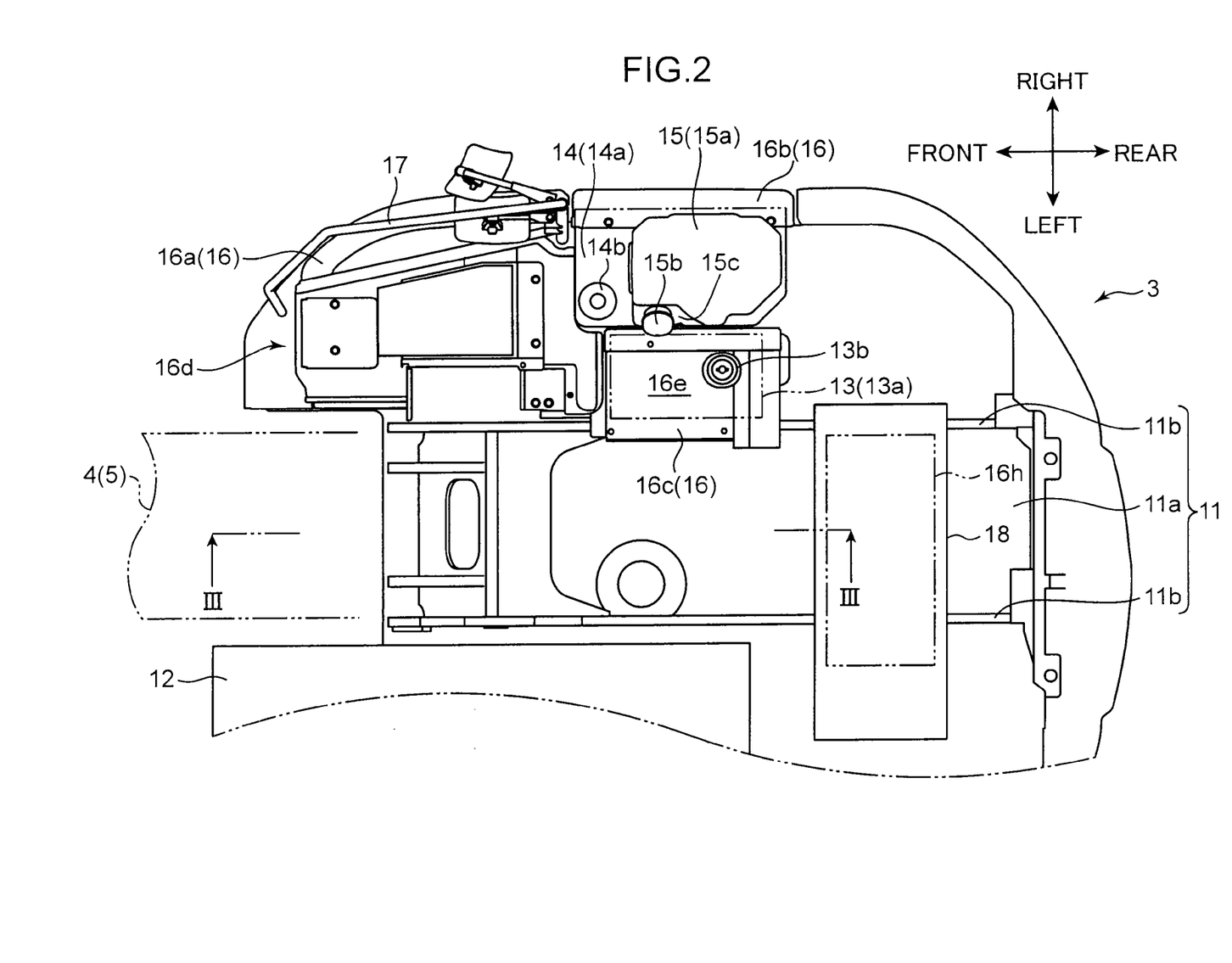
FIG. 2 is a plan view of the hydraulic excavator illustrated in FIG. 1, in which a part of the construction machine is omitted.

Referring to FIG. 1 and FIG. 2, the upper slewing body 3 is provided with an upper frame 11 provided on the lower traveling body 2; and is further provided with a cab 12, a hydraulic oil tank 13, a fuel tank 14, a reducing agent tank 15, an engine 18, a covering mechanism 16, and a handrail 17 respectively provided on the upper frame 11. In the following, the construction machine is described using the directions as viewed from the operator seated on the driver's seat in the cab 12.

The upper frame 11 is provided with a bottom plate 11a slewably attached on the lower traveling body 2, and a pair of vertical plates 11b disposed to stand upright on the bottom plate 11a. The vertical plates 11b extend in front and rear directions while facing each other in left and right directions. The base end of the boom 5 is attached on front end portions of the vertical plates 11b.

The cab 12 is disposed on the left side of the left vertical plate 11b on a front portion of the upper frame 11.

The hydraulic oil tank 13 is disposed on the side opposite to the cab 12 with respect to the vertical plates 11b. Specifically, the hydraulic oil tank 13 is provided with a hydraulic oil tank main body 13a disposed on the right side of the right vertical plate 11b, and an air breezer 13b projecting upward from the upper surface of the hydraulic oil tank main body 13a.

The fuel tank 14 is disposed at a position closer to the outer edge portion of the upper frame 11 (the bottom plate 11a) than the hydraulic oil tank 13 in plan view. Specifically, the fuel tank 14 is provided with a fuel tank main body 14a disposed on the right side of the hydraulic oil tank main body 13a, and an oil feeding port 14b projecting upward from the upper surface of the fuel tank main body 14a. The fuel tank main body 14a extends in front and rear directions along the outer right edge portion of the bottom plate 11a. The oil feeding port 14b is formed in the front left corner on the upper surface of the fuel tank main body 14a.

The reducing agent tank 15 accommodates therein a liquid reducing agent (e.g. urea water) for reducing nitrogen oxide contained in exhaust gas from the engine 18. Further, the reducing agent tank 15 is provided on the fuel tank main body 14a. Specifically, the reducing agent tank 15 is provided with a reducing agent tank main body 15a attached on the upper surface of the fuel tank main body 14a, and a replenishing port 15b projecting leftward from the reducing agent tank main body 15a. The reducing agent tank main body 15a is disposed behind the oil feeding port 14b of the fuel tank 14.

The engine 18 is provided on the vertical plates 11b at a position behind the cab 12, the hydraulic oil tank 13, and the fuel tank 14. Further, the engine 18 extends in left and right directions.

The covering mechanism 16 is configured to cover the upper frame 11, and the devices provided on the upper frame 11. Specifically, the covering mechanism 16 is provided with a front cover 16a which covers the upper frame 11 from above at a front position of the hydraulic oil tank 13 and the fuel tank 14, a side cover 16b which covers the fuel tank 14 from the right side, a tank cover 16c which covers the hydraulic oil tank 13 from above, a rear cover 16f (see FIG. 1) which covers the engine 18, and a hood 16g (see FIG. 1) disposed above the rear cover 16f.

Figure 4:
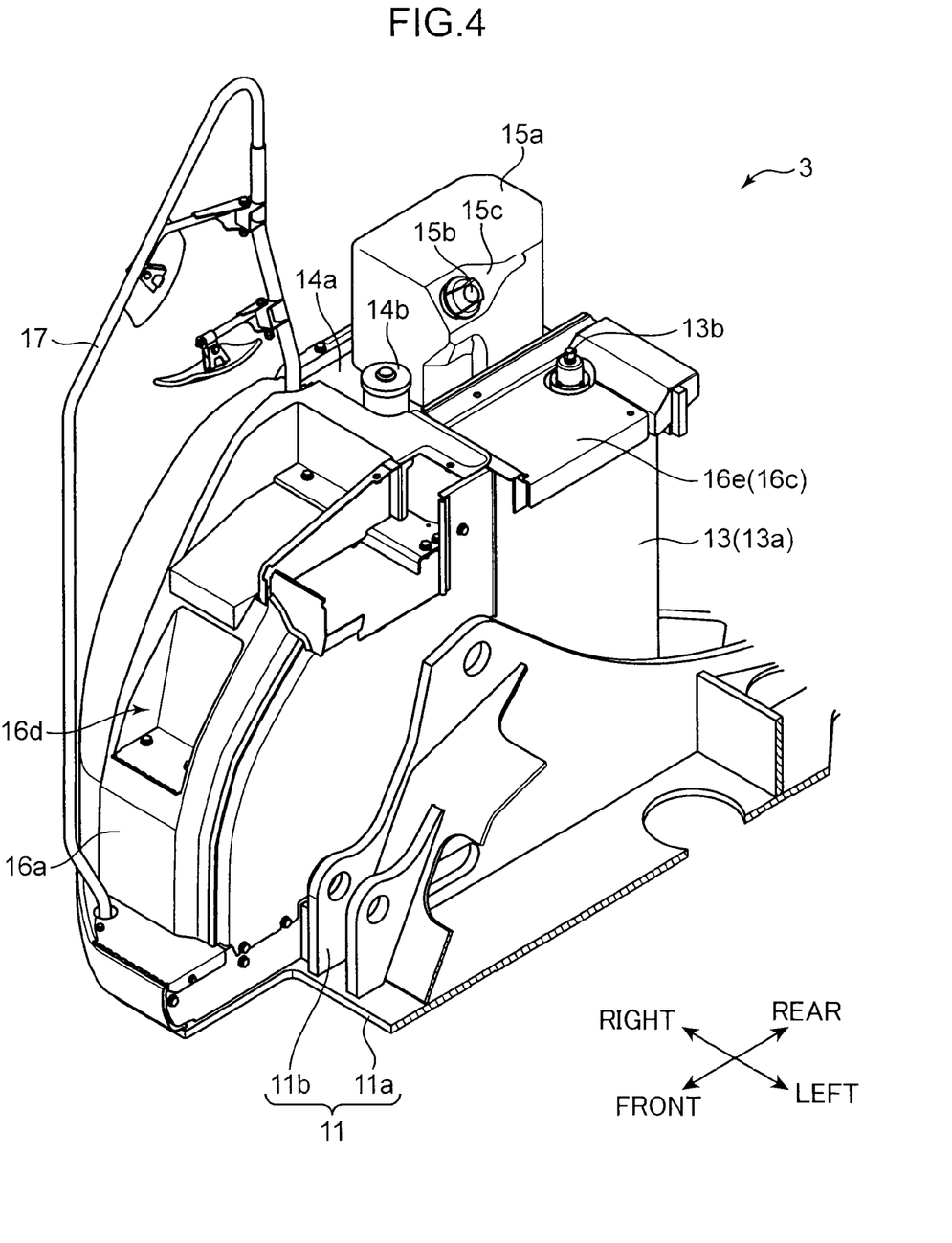
FIG. 4 is a perspective view of an upper slewing body illustrated in FIG. 3.

An accommodation chamber of the devices (e.g. an unillustrated control valve) is defined by the front cover 16a and the upper frame 11. Further, as illustrated in FIG. 4, the front cover 16a has stairs 16d for allowing the operator to climb on the tank cover 16c from the front side of the upper frame 11. The handrail 17 is provided for the operator to grip when the operator climbs the stairs 16d. Specifically, the handrail 17 includes a base end thereof extending upward from the bottom plate 11a, a inclined portion extending obliquely upward and rearward from the upper end of the base end along the stairs 16d, and a distal end thereof extending downward from the rear end of the inclined portion and connected to the upper portion of the front cover 16a.

The tank cover 16c includes a through-hole (the reference numeral thereof is omitted) for passing the air breezer 13b therethrough, and covers the hydraulic oil tank main body 13a from above.

As illustrated in FIG. 1, the rear cover 16f covers the engine 18 laterally and from above. Further, the rear cover 16f includes an opening 16h (see FIG. 2) for allowing the engine 18 to expose upward. The hood 16g (see FIG. 1) is attached to the rear cover 16f in such a manner that the hood 16g is shiftable between a position where the opening 16h is opened, and a position where the opening 16h is closed.

Referring to FIG. 2 and FIG. 4, the operator climbs on the tank cover 16c via the stairs 16d of the front cover 16a, and moves on the tank cover 16c toward the front portion of the hood 16g. In this state, the operator is allowed to open the hood 16g, and to perform maintenance of the engine 18. In other words, the upper surface of the tank cover 16c serves as the passage surface 16e provided (formed) on the upper frame 11 for allowing the operator to move to access the engine 18.

In the following, a positional relationship of the fuel tank 14 and the reducing agent tank 15 with respect to the passage surface 16e is described referring to FIGS. 2 to 4.

The fuel tank main body 14a is disposed on the right side of the passage surface 16e in proximity thereto in plan view.

The reducing agent tank main body 15a includes an upper placement portion 15d (see FIG. 3) disposed on the right side of the passage surface 16e at a position higher than the passage surface 16e. The upper placement portion 15d is adjacent to a right side edge portion of the passage surface 16e, and extends in front and rear directions along the right side edge portion of the passage surface 16e in plan view. In this example, the replenishing port 15b is formed in an end portion (the front end portion) of the upper placement portion 15d at a position near the oil feeding port 14b in plan view.

The oil feeding port 14b and the replenishing port 15b are disposed side by side in front and rear directions along a side edge portion (the right edge portion) of the passage surface 16e at a position near the oil feeding port 14b and the replenishing port 15b in plan view. Specifically, the replenishing port 15b is formed in a surface (an inclined surface 15c to be described later) of the reducing agent tank main body 15a facing the passage surface 16e. On the other hand, the oil feeding port 14b is formed in a side edge portion (the left edge portion) of the upper surface of the fuel tank main body 14a at a position near the passage surface 16e. In this way, the replenishing port 15b and the oil feeding port 14b are disposed at positions near the right side edge of the passage surface 16e.

Further, the replenishing port 15b is formed in the upper placement portion 15d in a state that the replenishing port 15b faces the passage surface 16e. Specifically, the inclined surface 15c facing upward on the side of the passage surface 16e is formed on the upper end portion of the upper placement portion 15d. The replenishing port 15b extends from the inclined surface 15c upward on the side of the passage surface 16e. In this way, the replenishing port 15b projects from the upper end portion of the upper placement portion 15d, and is inclined upward on the side of the passage surface 16e.

Further, the upper placement portion 15d is disposed at a position (the right side position) closer to the outer edge portion (the outer right edge portion) of the upper frame 11 (the bottom plate 11a) than the passage surface 16e in plan view.

Figure 3:
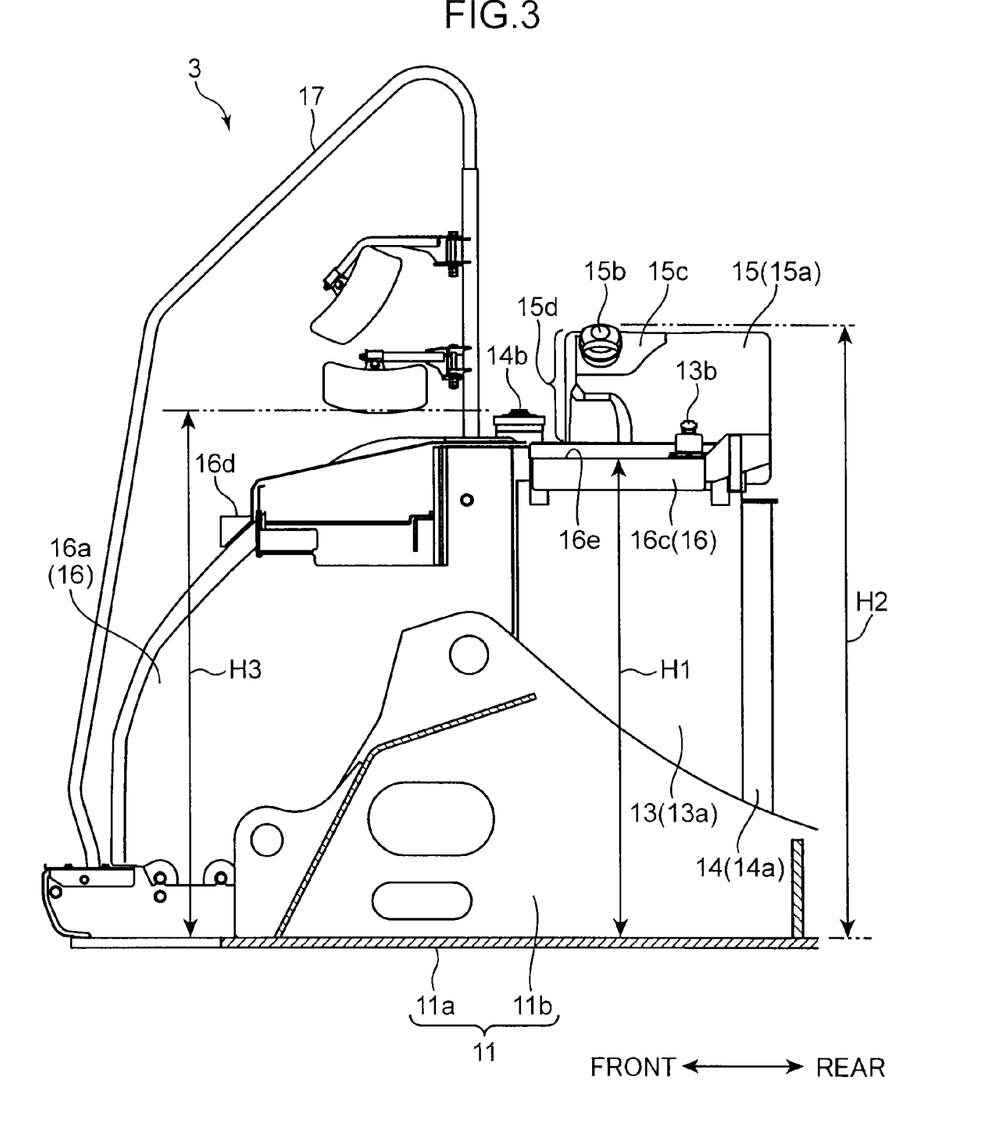
FIG. 3 is a sectional view taken along the line in FIG. 2.

Next, referring to FIG. 3, the height positions of the fuel tank 14 and of the reducing agent tank 15 with respect to the passage surface 16e are described.

The upper placement portion 15d of the reducing agent tank 15 and the replenishing port 15b formed in the upper placement portion 15d are formed at positions higher than the height position H1 of the passage surface 16e. In the embodiment, the highest position H2 of the reducing agent tank 15 corresponds to the upper end position of the replenishing port 15b. The height position H3 of the upper end portion of the oil feeding port 14b is higher than the height position H1 of the passage surface 16e, and is lower than the height position H2 of the reducing agent tank 15. The highest position (the reference numeral thereof is omitted) of the handrail 17 is higher than all the height positions H1 to H3.

As described above, the replenishing port 15b of the reducing agent tank 15 is formed at a position higher than the passage surface 16e, and faces the passage surface 16e. Therefore, the operator standing on the passage surface 16e can easily access the replenishing port 15b, while slightly lowering his/her waist and facing the upper placement portion 15d.

This is advantageous in reducing the burden of the operator when the operator replenishes the liquid reducing agent.

Further, the upper placement portion 15d disposed at a position higher than the passage surface 16e is disposed laterally on the passage surface 16e. Therefore, the upper placement portion 15d serves as a barricade when the operator walks on the passage surface 16e laterally offset from the center of the passage surface 16e. This configuration gives a sense of security to the operator, because the operator can securely stand on the passage surface 16e even if he or she staggers or totters on the passage surface 16e.

Further, according to the embodiment, the following advantageous effects are provided.

In the embodiment, the upper placement portion 15d is disposed at a position closer to the outer edge portion of the upper frame 11 than the passage surface 16e in plan view. Therefore, a barricade (the upper placement portion 15d) is formed on the outer side of the upper frame 11, in other words, on the side from which the operator looks down the ground, as viewed from the operator standing on the passage surface 16e. This is advantageous in eliminating the fear from the operator when the operator stands at a high place i.e. the passage surface 16e.

According to the embodiment, as described above, the oil feeding port 14b of the fuel tank 14 is provided to align with the replenishing port 15b of the reducing agent tank 15 provided so as to face the passage surface 16e along the side edge portion of the passage surface 16e. In other words, the replenishing port 15b and the oil feeding port 14b are disposed at positions near the side edge portion of the passage surface 16e. This allows for the operator to replenish the reducing agent tank 15 with a liquid reducing agent, and to replenish the fuel tank 14 with fuel, while standing on the passage surface 16e.

In this example, the liquid reducing agent is consumed in accordance with the consumption of fuel. Normally, the liquid reducing agent and the fuel are replenished substantially at the same timing. Therefore, as described above, allowing the operator to replenish the liquid reducing agent and the fuel while standing on the passage surface 16e makes it possible for the operator to perform the replenishing operations efficiently.

According to the embodiment, the upper placement portion 15d extends along the side edge portion of the passage surface 16e. This gives the above sense of security to the operator for a sufficiently long length along the passage surface 16e. In addition to the above, forming the replenishing port 15b at a position near the oil feeding port 14b allows for the operator to efficiently replenish the liquid reducing agent and the fuel.

Further, according to the embodiment, the replenishing port 15b projects from the upper end portion of the upper placement portion 15d, and is inclined upward on the side of the passage surface 16e. This makes it possible to form the replenishing port 15b at a position near the operator's hands and in a direction toward the operator's hands. This is advantageous in allowing the operator to efficiently replenish the liquid reducing agent.

In the embodiment, the upper placement portion 15d is disposed at a position closer to the outer edge portion of the upper frame 11 than the passage surface 16e in plan view. Alternatively, the positions of the upper placement portion 15d and the passage surface 16e may be reversed.

In the embodiment, the reducing agent tank 15 is provided on the fuel tank main body 14a. The installation position of the reducing agent tank 15 is not limited to the position on the fuel tank main body 14a. Alternatively, the reducing agent tank 15 may be provided on a device, other than the fuel tank main body 14a, which is provided on the upper frame 11. Further, the reducing agent tank 15 may be mounted on the upper frame 11 (the bottom plate 11a).

In the embodiment, the upper surface of the tank cover 16c serves as the passage surface 16e. The passage surface is not limited to the upper surface of the tank cover 16c. For instance, the upper surface of a device on the upper frame 11 (e.g. the upper surface of the hydraulic oil tank), or the upper surface of the upper frame 11 (the bottom plate 11a) may serve as the passage surface.

In the embodiment, the replenishing port 15b is disposed behind the oil feeding port 14b. The installation position of the replenishing port 15b is not limited to the above. Alternatively, the replenishing port 15b may be disposed in front of the oil feeding port 14b.

The aforementioned embodiment mainly includes the following features.

Specifically, an aspect of the invention provides a construction machine including a lower traveling body, an upper frame slewably provided on the lower traveling body, a reducing agent tank provided on the upper frame, and configured to accommodate therein a liquid reducing agent for reducing nitrogen oxide contained in exhaust gas, and a passage surface provided on the upper frame for allowing an operator to move to a predetermined device on the upper frame. The reducing agent tank includes an upper placement portion disposed laterally on the passage surface at a position higher than the passage surface. The upper placement portion of the reducing agent tank has a replenishing port for allowing the operator to replenish the liquid reducing agent, the replenishing port being provided so as to face the passage surface.

According to the present invention, the replenishing port of the reducing agent tank is formed at a position higher than the passage surface, and faces the passage surface. Therefore, the operator standing on the passage surface can easily access the replenishing port, while slightly lowering his/her waist and facing the upper placement portion.

Thus, the present invention is advantageous in reducing the burden of the operator when the operator replenishes the liquid reducing agent.

Further, the upper placement portion disposed at a position higher than the passage surface is disposed laterally on the passage surface. Thus, the upper placement portion serves as a barricade when the operator walks on the passage surface laterally offset from the center of the passage surface. The present invention gives a sense of security to the operator, because the operator can securely stand on the passage surface even if he or she staggers or totters on the passage surface.

In particular, when the upper placement portion of the reducing agent tank is disposed at a position closer to an outer edge portion of the upper frame than the passage surface in plan view, a barricade (the upper placement portion) is formed on the outer side of the upper frame, in other words, on the side from which the operator looks down the ground, as viewed from the operator standing on the passage surface. This is advantageous in eliminating the fear from the operator when the operator stands at a high place i.e. the passage surface.

The reducing agent tank may be directly provided on the upper frame. However, when the construction machine further includes a fuel tank including a fuel tank main body provided on the upper frame, and an oil feeding port formed in an upper surface of the fuel tank main body, and the reducing agent tank is provided on the upper surface of the fuel tank main body, preferably, the replenishing port and the oil feeding port may be disposed side by side along a side edge portion of the passage surface in plan view.

According to the aspect, the oil feeding port of the fuel tank is provided to align with the replenishing port of the reducing agent tank provided so as to face the passage surface along the side edge portion of the passage surface. In other words, the replenishing port and the oil feeding port are disposed at positions near the side edge portion of the passage surface. This allows the operator to replenish the reducing agent tank with a liquid reducing agent, and to replenish the fuel tank with fuel, while standing on the passage surface.

The liquid reducing agent is consumed in accordance with the consumption of fuel. Normally, the liquid reducing agent and the fuel are replenished substantially at the same timing. Therefore, as described above, allowing the operator to replenish the liquid reducing agent and the fuel while standing on the passage surface makes it possible for the operator to perform the replenishing operations efficiently.

The replenishing port of the reducing agent tank may be provided so as to face the passage surface. However, when the upper placement portion of the reducing agent tank extends along the side edge portion of the passage surface in plan view, preferably, the replenishing port of the reducing agent tank may be provided in an end of the upper placement portion near the oil feeding port in plan view.

According to the aspect, the upper placement portion extends along the side edge portion of the passage surface. This gives the above sense of security to the operator for a sufficiently long length along the passage surface. In addition to the above, forming the replenishing port at a position near the oil feeding port allows for the operator to efficiently replenish the liquid reducing agent and the fuel.

In the construction machine, preferably, the replenishing port may project from an upper end portion of the upper placement portion, and may be inclined upward on a side of the passage surface.

According to the aspect, the replenishing port is inclined upward. Therefore, it is possible for the operator to pour the liquid reducing agent into the reducing agent tank from above. This makes it easy for the operator to replenish the liquid reducing agent.

This application is based on Japanese Patent Application No. 2014-069938 filed on Mar. 28, 2014, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A construction machine, comprising:
    a lower traveling body;
    an upper frame slewably provided on the lower traveling body;
    a reducing agent tank provided on the upper frame, and configured to accommodate therein a liquid reducing agent for reducing nitrogen oxide contained in exhaust gas;
    a passage surface provided on the upper frame for allowing an operator to move to a predetermined device on the upper frame; and
    a fuel tank including a fuel tank main body provided on the upper frame, and an oil feeding port formed in an upper surface of the fuel tank main body, wherein:
    the reducing agent tank includes an upper placement portion disposed laterally on the passage surface at a position higher than the passage surface;
    the upper placement portion of the reducing agent tank has a replenishing port for allowing the operator to replenish the liquid reducing agent, the replenishing port being provided so as to face the passage surface;
    the reducing agent tank is provided on the upper surface of the fuel tank main body, and
    the replenishing port and the oil feeding port are disposed side by side along a side edge portion of the passage surface in plan view.

2. The construction machine according to claim 1, wherein the upper placement portion of the reducing agent tank is disposed at a position closer to an outer edge portion of the upper frame than the passage surface in plan view.

3. The construction machine according to claim 1, wherein the upper placement portion of the reducing agent tank extends along the side edge portion of the passage surface in plan view, and
the replenishing port of the reducing agent tank is provided in an end of the upper placement portion near the oil feeding port in plan view.

4. The construction machine according to claim 1, wherein the replenishing port projects from an upper end portion of the upper placement portion, and is inclined upward on a side of the passage surface.

* * * * *